United States Patent [19]

Racciato

[11] 4,324,554

[45] Apr. 13, 1982

[54] USE OF TKP AS AN ANTIMIGRANT

[75] Inventor: Joseph S. Racciato, San Diego, Calif.

[73] Assignee: Merck & Co., Inc., Rahway, N.J.

[21] Appl. No.: 959,119

[22] Filed: Nov. 9, 1978

[51] Int. Cl.$^3$ .............................................. D06P 1/50
[52] U.S. Cl. ............................................ 8/561; 8/933
[58] Field of Search ...................................... 8/91, 561

[56] References Cited

U.S. PATENT DOCUMENTS

| | | | |
|---|---|---|---|
| 3,287,350 | 11/1966 | Deguchi | 260/209 |
| 3,399,189 | 4/1968 | Gordon | 260/209 |
| 3,765,832 | 10/1973 | Shelso et al. | 8/91 |
| 3,928,676 | 12/1975 | Drelich et al. | 427/341 |

FOREIGN PATENT DOCUMENTS

| | | |
|---|---|---|
| 226052 | 7/1962 | Austria . |
| 2616881 | 11/1976 | Fed. Rep. of Germany . |

OTHER PUBLICATIONS

*Textile Chemist and Colorist*, vol. 7, No. 11, pp. 192–200 (1975).
R. L. Whistler, ed., *Industrial Gums*, pp. 407–411.
*Current Science*, 24, pp. 235–236 (1955).
*Chem. Ind.* (London), pp. 212–214 (1956).
*Sci. Cult., 21, pp. 744–746 (1956).*
*J. Chem. Soc.*, pp. 2600–2603 (1956).
*Indian Text J.*, 65, pp. 418–421 (1955).
*Indian Text J.*, 66, pp. 33–35, 309–311 (1956).
*Chem. Abs.*, par. 50: 15091g (1956).
"Industrial Gums", Whistler, 2nd ed., 1973, pp. 388, 393 & 394.

*Primary Examiner*—Wilbert J. Briggs
*Attorney, Agent, or Firm*—Gabriel Lopez; Hesna Pfeiffer; Julian S. Levitt

[57] ABSTRACT

TKP is used for the control of migration during pad dyeing of fabrics.

8 Claims, No Drawings

USE OF TKP AS AN ANTIMIGRANT

CROSS-REFERENCE

This application is related to an application U.S. Ser. No. 959,120 filed on even date herewith and entitled "Cold-Water Soluble Tamarind Gum." The teachings of that application are incorporated herein in their entirety by reference.

BACKGROUND OF THE INVENTION

In commercial dyeing operations in which a substrate is impregnated by padding with an aqueous dye-bath liquid, as in the conventional Thermosol process (a well established procedure for commercial dyeing operations), the dye-impregnated substrate is commonly subjected to an intermediate drying stage prior to thermofixation or reduction of the dye. It is during this intermediate drying stage that problems with migration of the dye can occur. Migration of the dye is undesirable as the substrate becomes mottled, or unevenly shaded, thereby detracting from the appearance and the value of the dyed textile substrate.

In the conventional drying operation following the impregnating of the textile with the desired dye, the treated substrate is heated and held for a time sufficient to dry off the dyebath liquor, conveniently at a temperature of about 100° C. for convenience of rapid action by any suitable means such as hot air, infrared radiation, microwave oven, or the like. Pressures may range from below to above atmospheric pressure. It is during this conventional drying operation that dye migration to the substrate surface is known to occur, said migration tending to be uncontrolled, random, and uneven, resulting in an uneven overall dyeing action, variegation, and a generally inferior quality of the finished product.

Dye migration occurs three-dimensionally; that is, in the warp and filling directions and through the fabric thickness. Migration in the warp direction does not significantly affect substrate appearance; however, migration in the filling direction and through the substrate thickness always will occur to some degree even under proper commercial drying conditions.

Many materials, including natural gums (e.g., again) and various synthetic gums have been proposed as antimigrants to gain control over migration. (Refer to U.S. Pat. No. 3,928,676, which teaches the art of controlling migration on porous materials by using resin compositions and methods that include addition of an aluminum hydroxy salt of high molecular weight.) Many of the materials proposed in the literature are described with respect to their thickening characteristics, the terms "thickener" and "antimigrant" commonly being used synonymously. While many proposed antimigrants also find application in systems as thickeners, the more persuasive teachings available suggest that the viscosity of the dye bath per se does not have any significant effect with respect to the uncontrolled dye migration problem previously discussed. Rather, it is suggested that the function of the antimigrant is to agglomerate the dye particles in a controlled manner. The resulting agglomeration of particles imposes size constraints on the dye particles, thereby decreasing their mobility, or migration. (Refer to "Processes Involved in Particulate Dye Migration," *Textile Chemist and Colorist,* vol. 7:11, p. 192–200, 1975.)

There exists in the art a need for less expensive, more technically efficient antimigrants having enhanced compatibility with aqueous dye-bath liquor systems for the dyeing of substrates.

SUMMARY OF THE INVENTION

It has now been found that TKP is useful as an antimigrant in pad-dyeing systems.

DETAILED DESCRIPTION OF THE INVENTION

As used herein, TKP refers to (1) tamarind kernel powder, a commercially available product obtained from the seed kernels of the tree *Tamarindus indica Linn;* (2) cold-water soluble tamarind kernel powder (CWSTG) prepared by mixing crude tamarind kernel powder in water at a concentration of 0.1 to 75.0% (preferably 20–50%), heating the solution to a temperature of 35°–130° C. (preferably 70°–100° C.) until a paste is formed, then drying and milling the resulting product, which is cold water soluble tamarind kernel powder; (3) purified tamarind kernel powder as taught by U.S. Pat. No. 3,399,189 for obtaining the tamarind polysaccharide extract and by U.S. Pat. No. 3,287,350 for extraction of the tamarind polysaccharide as tamarind seed jellose (TSJ); and (4) other tamarind kernel powder constituents, i.e., the residual after the tamarind polysaccharide has been removed, viz. a combination of proteins, fiber, fat, inorganic salts, free sugars, and tannins.

Commercially, tamarind kernel powder is usually dispersed in water and a uniform solution obtained by boiling. A solution thus made is useful for many purposes, e.g., as a warp size instead of starch or as a creaming agent in rubber latex concentrate.

As used herein, substrate means a textile such as a woven, non-woven, or knitted fabric, and also yarns, threads, and fibers which can be pad dyed on a continuous basis.

TKP may be used in pad-dyeing operations with any available dyes and combinations thereof: e.g., disperse, direct, vat, reactive, or acid dyes. No limitation has yet been found to the types of dyes which may be used with this invention. Dye/TKP antimigrant solutions may be used to print any substrate suitable for pad dyeing; for example, 100% polyester, 100% cotton, polyester/cotton blends in any ratio, corduroy, 100% nylon, 100% polypropylene, 100% acrylic, and polyester/cotton/nylon/polypropylene/acrylic blends in any combination and ratio. The use level of TKP as an antimigrant will vary from 0.01% to over 5.00% based on the total weight of the dye-bath liquor with the TKP concentration being preferably in the range of about 0.01% to 3.00% by weight. These levels will depend on the type of substrate and dye used as well as the method of application and drying procedure. At TKP concentrations above 5%, the viscosity of the solution becomes a problem and such solutions are not recommended.

It should be noted that the pH of the aqueous dye-bath liquor of the invention can generally vary over a rather broad range although it will be appreciated that optimum pH limits will pertain to particular dye-bath systems.

After the textile material being treated has been impregnated with a desired dye by contact with the aqueous dye-bath liquor of the present invention, and the material has been dried by conventional means, the dye is fixed by heat or other means, e.g., by chemical action. Such fixation techniques are well known and established in the textile dyeing art. The present invention is not limited to any such technique but can be practiced with dye fixation by any conventional technique following the drying of the dye-impregnated fiber. Illustratively, curing may be carried out at temperatures of about 120° to 230° C. for about three minutes to 15 seconds, depending on the fabric, the dye, and other contributing factors.

It will be appreciated by those skilled in the art that a variety of additives may be present in the aqueous dye-bath liquor apart from the dye itself and the water with which it is associated in the dye-bath liquor. Such additives include dye assistants, carriers, promoters, and the like, and these may be employed in conventional amounts for their usual purposes in the practice of the present invention. The dye itself may be incorporated in the dye-bath liquor in amounts generally up to about 5% or more by weight based on the total weight of the dye bath. For heavier or darker shades the dye may be employed in amounts typically of from about 2% to about 5% by weight, most typically about 3–4% by weight; whereas light shades may be achieved by employing dye concentrations of about ½% by weight or less. Dye concentrations outside such ranges also can be employed within the scope of the invention; however, it is also understood that the amount of said dye-bath liquor with which the textile material is impregnated by padding, spraying, coating, printing, or other means commonly at 25–100% wet pickup will depend upon the color requirements of any given application.

The extent of dye migration can be nonsubjectively measured by a test recently adopted by the American Association of Textile Chemists and Colorists (AATCC), as described in "Evaluation of Dyestuff Migration," AATCC Test Method 140–1974, and in *AATCC Technical Manual* (23). Warp- and filling-direction migration can be determined by this test, as can migration through the substrate thickness, by mathematical equations relating the measured horizontal-migration values with the vertical thickness migration.

Briefly, in the AATCC test, a substrate is padded through a dye- and auxiliary-containing bath, is padded to a specified pick-up level, and finally is placed on a flat, nonporous surface (e.g., glass plate) and covered with a watch glass. The watch glass serves to minimize any evaporation and, thus, aids assessment of any particulate migration in the liquid phase by forcing the migration to occur horizontally through the substrate interior, i.e., from the watch-glass-covered area to the uncovered area.

CWSTG is made by mixing TKP in water at concentrations of 0.1 to 75%, heating this mix to a temperature of 35°–130° C., and then drying (and optionally milling) the resulting CWSTG. The heating and drying steps can be combined, as in the drum drying process. The milling step is preferred so as to produce minute particles which readily hydrolyze.

TKP subjected to this process exhibits cold-water solubility. As indicated, this process does not require the addition of bleaching agents, or any precipitation and/or filtration steps to yield CWSTG. The process conserves time of preparation, reduces reagent costs, and gives yields of approximately 100%. The constraints inherent in said process are governed by temperature, time, and pressure relationships; i.e., at lower temperatures, longer periods of time are required to develop full solubility.

CWSTG can be defined in terms of the viscosity of a solution prepared with cold water (i.e., 5°–35° C.). A CWSTG aqueous solution prepared by adding CWSTG powder to cold water and mixing under moderate shear (e.g., Lightnin Mixer at 800–1,000 rpm) for one hour develops a viscosity of greater than 10 cP (Brookfield LVP viscometer, spindle 1, 60 rpm) at a 1% concentration and greater than 1,000 cP (Brookfield LVF viscometer, spindle 3, 60 rpm) at 10% concentration.

Heating of the TKP/water mix can be accomplished by various methods, including, but not limited to, infrared irradiation, conventional steam heating, drum drying, and microwave heating. The temperature range necessary to achieve cold-water solubility is from 35° C. to just below degradation temperature of TKP; preferably 35°–130° C. TKP held at lower temperatures requires a longer time for viscosity to develop and does not develop the same viscosity as TKP held at higher temperatures. The optimum temperature range is 70°–100° C. at atmospheric pressure.

It is preferred that the TKP concentration range from 4% to 60%. A still more preferred range is 20% to 50%.

The present invention is hereinafter illustrated by reference to specific examples. It is understood that such examples are presented to provide a further understanding as to the advantages of the invention and should not be construed as limiting the scope of the invention.

EXAMPLE 1

Tamarind Kernel Powder, 0.3% Solution

A 15% solution of tamarind kernel powder is prepared by heating the aqueous slurry to 90° C. for five minutes and then cooling to room temperature. This concentrate is used as the antimigrant agent in the following aqueous formulation:
  20.0 g/liter TKP concentrate (15% solids)
  12.2 g/liter Eastman Polyester Brilliant Red FFBL ® (disperse dye)
  23.0 g/liter Eastman Polyester Blue GBT ® (disperse dye)
  19.5 g/liter Eastman Polyester Yellow 5GLS ® (disperse dye)
®Eastman Polyester disperse dyes are registered trademarks of Eastman Chemical Products, Inc.

The resulting solution, which contains 0.3% TKP, is padded onto 100% polyester fabric at a level of 80% wet pick-up (based on the weight of the fabric), dried, fixed by the Thermosol method at 213° C. for 60 seconds, washed, and dried. This process produces a uniform color over the entire piece of fabric as determined by AATCC Test Method 140-1974. When the TKP is omitted, the pad dyeing produces an uneven, mottled appearance in the fabric which is uncontrollable and undesirable.

EXAMPLE 2

Purified Tamarind Kernel Powder, 0.3% Solution

A 10% solution of purified tamarind kernel powder produced according to U.S. 3,399,189 is prepared and then used as the antimigrant agent in the following aqueous formulation:
  30.0 g/liter Purified TKP concentrate (10% solids)
  50.0 g/liter FORON RUBINE S-2BFL ® (disperse dye)
  0.05 g/liter TERGITOL ® 15-S-9 (wetting agent)

®FORON RUBINE S-2-BFL is a registered trademark of Sandoz Colors and Chemicals.
TERGITOL 15-S-9 is a registered trademark of Union Carbide Corp.

This formulation, which contains 0.3% TKP, is padded onto 100% woven polyester fabric at 70% wet pickup (based on the weight of the fabric), dried, fixed with steam at 25 psi for one hour, then washed and dried. The test method used to observe migration effects is the previously described AATCC Test Method 140-1974. The resulting pad-dyed fabric has uniform color throughout (AATCC Test Method). When the TKP concentrate is not added, the fabric color is not uniform and is, hence, undesirable.

EXAMPLE 3

Cold-Water Soluble Tamarind Kernel Powder, 0.25% Solution

The following formulation is used to pad dye a polyester/cotton blend:
- 2.5 g/liter—CWSTG
- 3.2 g/liter—FORON ® Printing Blue S-BGL (50% paste)
- 1.6 g/liter—FORON Printing Yellow SE-SCW (5% paste)
- 0.4 g/liter—PROCION ® Yellow T-4G liquid
- 0.8 g/liter—PROCION Blue T-G liquid
- 35.0 g/liter—FIXANOL ® T
- 4.0 g/liter—Ammonium dihydrogen phosphate
- 5.0 g/liter—DISPERSANOL ® K pH adjusted to 5–6.5 by addition of monobasic ammonium phosphate or dibasic ammonium phosphate.

This formulation is padded onto an 80% polyester/20% cotton fabric to a pick-up of 90% based on the weight of the fabric. The pad-dyed fabric is then pre-dried in an infrared unit followed by conventional drying. The dyes are fixed at 210° C. for 90 seconds in a hot-air oven, followed by: a rinse containing 8.0 g/liter caustic soda at 80° C., a rinse at 80° C. in water, a rinse at 80° C. with 2.0 g/liter caustic soda and 2.0 g/liter SYNTHRAPOL ® SP, a rinse at 80° C. in water, a rinse at 60° C. with 2.0 g/liter acetic acid, and a rinse at 60° C. in water. The fabric is then dried. A uniform color is observed over the entire piece of fabric as determined by the AATCC test. If the antimigrant is not added, then the fabric assumes a mottled appearance.
®FORON is a registered trademark of Sandoz PROCION, FIXANOL, DISPERSANOL, and SYNTHRAPOL are registered trademark of Imperial Chemical Industries

EXAMPLE 4

Purified Tamarind Kernel Powder, 0.1% Solution

A 10% aqueous solution of purified TKP produced according to U.S. Pat. No. 3,399,189 is prepared and then used as the antimigrant agent in the following aqueous formulation:
- 10.0 g/liter—Purified TKP concentrate (10% solids)
- 45.0 g/liter—LATYL ® Yellow GFSW (disperse dye)
- 0.05 g/liter—TERGITOL ® 15-S-9 (wetting agent)

LATYL is a registered trademark of E. I. duPont de Nemours & Co.
TERGITOL is a registered trademark of Union Carbide Corp.

This formulation, which contains 0.1% TKP, is padded onto 100% woven polyester fabric at 70% wet pick-up (based on the weight of the fabric), dried, fixed with steam at 25 psi for one hour, then washed and dried. The resulting pad-dried fabric shows uniform color as indicated by the AATCC test. When the TKP concentrate is not added, the fabric color is not uniform and is, hence, undesirable.

EXAMPLE 5

TKP is dispersed in water to a concentration of 20%, heated to 95° C. for 10 minutes, then dried and milled. The resulting product is dissolved in water at 20° C. and develops a viscosity of 35 cP at 1% concentration, measured on a Brookfield LVP viscometer, spindle 1, 60 rpm.

EXAMPLE 6

TKP is dispersed in water at ambient temperature at a concentration of 40%. The resulting paste is drum dried with internal steam pressure at 40 psi, and then milled. The resulting product readily dissolves in ambient-temperature water and imparts a viscosity of 30 cP at 1% concentration, measured on a Brookfield LVF viscometer, spindle 1, 60 rpm.

EXAMPLE 7

Comparisons of TKP vs CWSTG

A 3% dispersion of TKP is made up by dispersing the TKP in water at room temperature. A solution of CWSTG as prepared in Example 5 is also made up as a 3% solution at room temperature. The viscosities of the dispersion and the solution are measured after 15 minutes of mixing at 1200 rpm on a Lightnin Mixer. The viscosity of the TKP is less than 2 cP as measured on a Brookfield LVF viscometer, spindle 1, 60 rpm, compared with the viscosity of the CWSTG which is 400 cP as measured on the Brookfield LVF viscometer, spindle 3, 60 rpm.

The respective viscosities are remeasured after 4 hours of mixing. The TKP imparts a viscosity of 10 cP whereas the CWSTG imparts a viscosity of 1,100 cP. These viscosities remain unchanged after 24 and 48 hours.

EXAMPLE 8

TKP is processed according to the purification process detailed in U.S. 3,399,189 and compared to CWSTG as prepared in Example 6. Compositional analysis shows the following differences between the two gums:

| | % Protein | % Uronic Acid | % Molar Ratios NEUTRAL SUGARS | | | | |
|---|---|---|---|---|---|---|---|
| | | | Arabinose | Xylose | Mannose | Glucose | Galactose |
| CWSTG | 15.0 | 7.5 | 7.0 | 31.0 | trace | 48.0 | 14.0 |
| Processed TKP | 7.0 | 9.0 | 5.0 | 36.0 | — | 45.0 | 14.0 |

What is claimed is:

1. In an aqueous dye-bath liquor suitable for impregnating substrates, the improvement that comprises the incorporation in said dye-bath liquor, as an antimigrant, of TKP at a concentration ranging from about 0.01% to about 5.00% by weight based on the total weight of said dye-bath liquor, wherein said TKP is tamarind kernel powder or cold-water soluble tamarind kernel powder.

2. The dye-bath of claim 1, wherein the antimigrant is cold-water soluble tamarind kernel powder.

3. The dye-bath of claim 1 wherein the TKP concentration ranges from 0.1% to 0.3%.

4. The dye-bath of claim 1 wherein the TKP concentration ranges from 0.01% to about 3%.

5. A process for the dyeing of substrates that comprises:
   a. impregnating the substrate with an aqueous dye-bath liquor which comprises TKP at a concentration ranging from about 0.01% to about 5.00% by weight based on the total weight of said dye-bath liquor, wherein said TKP is tamarind kernel powder or cold-water soluble terminal kernel powder;
   b. drying said substrate; and
   c. fixing said dry, dye-impregnated substrate.

6. The process of claim 5 wherein the TKP concentration ranges from 0.01 to 3%.

7. The process of claim 5 wherein the TKP concentration ranges from 0.1% to 0.3%.

8. The process of claim 6 wherein the TKP is cold-water soluble tamarind kernel powder.

* * * * *